UNITED STATES PATENT OFFICE.

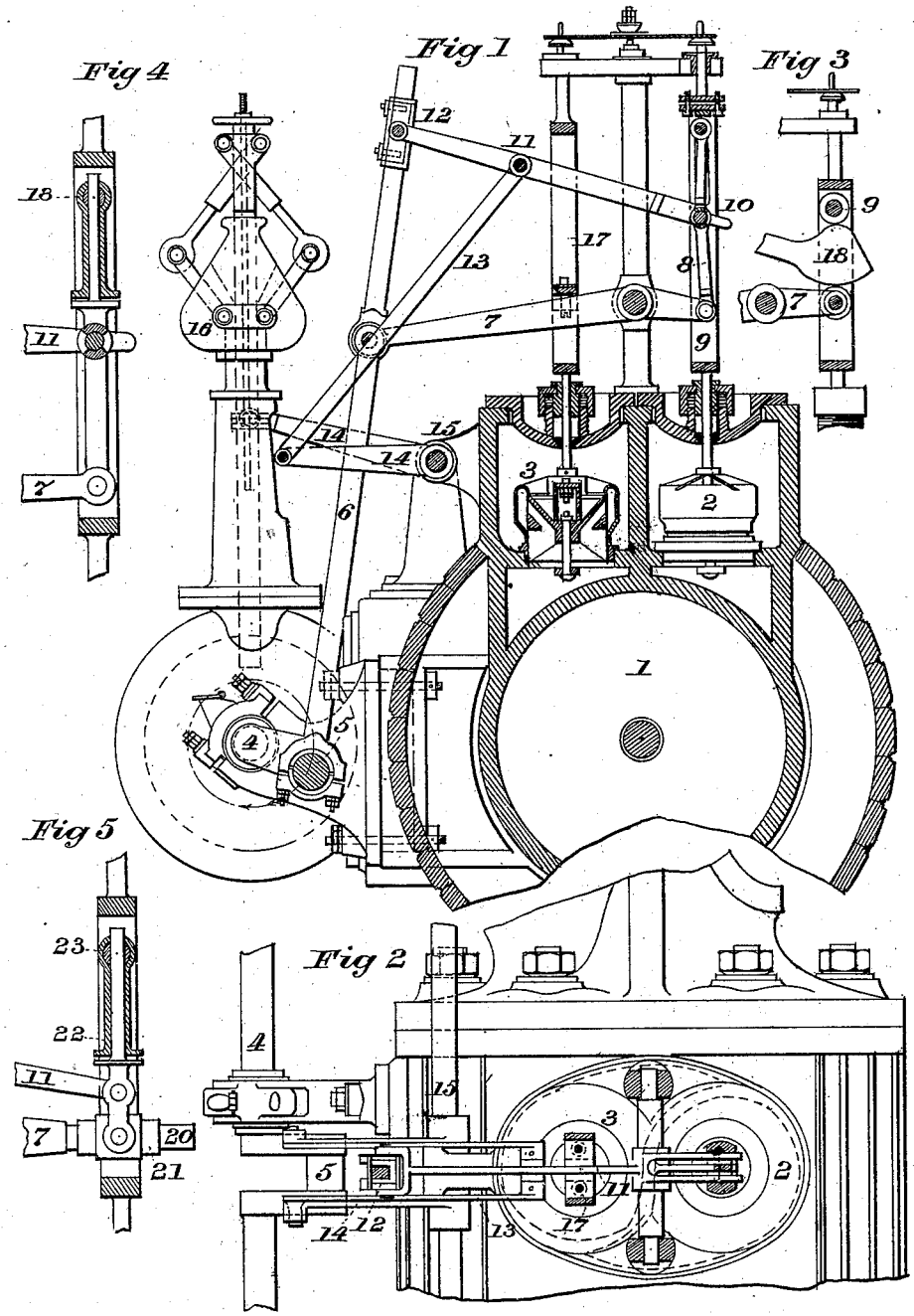
A. COLLMANN.
Valve-Gear for Engines.
No. 203,534. Patented May 14, 1878.

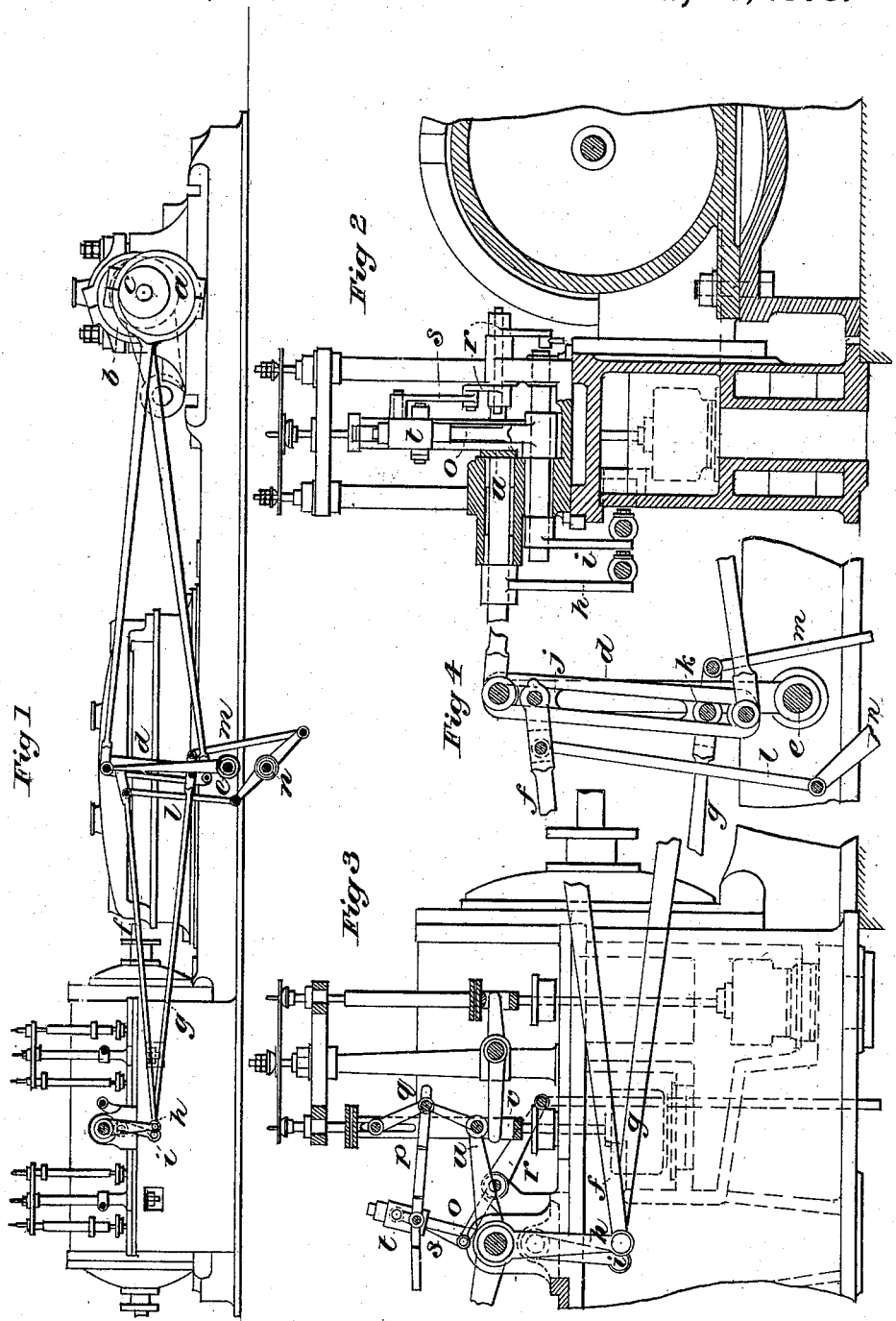

ALFRED COLLMANN, OF VIENNA, AUSTRIA.

IMPROVEMENT IN VALVE-GEARS FOR ENGINES.

Specification forming part of Letters Patent No. 203,534, dated May 14, 1878; application filed October 26, 1877.

*To all whom it may concern:*

Be it known that I, ALFRED COLLMANN, of Vienna, in the Empire of Austria, have invented a new and useful Improvement in Valve-Gears for Engines, which improvement is fully set forth in the following specification, reference being had to the accompanying drawings.

The object of this invention is to so construct and arrange gear for operating the valves of elastic-fluid engines that the admission-valve shall open and close so as to admit fluid to the cylinder during any required portion of the stroke of the piston, while the motion of the exhaust-valve shall allow of the emission of the elastic fluid during the whole or nearly the whole of the stroke of the said piston.

For the above purpose the gear which connects the eccentric or other operating agent with the admission-valve and gives motion thereto is constructed in two portions, joined together by a variable or compound joint, which receives a constant motion from that portion of the gear, or receiving motion from the eccentric or like operating agent, and a variable motion determined in its size by the governor. The action of the governor on the said variable or compound joint alters in any desired degree the motion of that portion of the gear which is connected to the admission-valve, and thereby controls the admission of elastic fluid to the cylinder. The exhaust-valve is connected to that portion of the gear which receives motion from the eccentric or other operating agent.

That my invention may be better understood, I have appended hereto two sheets of drawings, in which my improvements are shown—in Sheet I applied to a non-reversing, and in Sheet II to a reversing, engine.

Figure 1, Sheet I, is a sectional end view, and Fig. 2 a plan view, of apparatus or appliances constructed under my invention applied to a non-reversing engine.

1 is the cylinder. 2 is the admission-valve. 3 is the exhaust-valve. 4 is a shaft receiving motion from the crank-shaft; 5, crank on 4, which gives motion to the rod 6. The rod 6 gives motion through the lever 7 to the toggle-joint 8, which gives motion to the valve-rod 9 by means of the topmost joint, which can slide up and down the valve-rod, so as to raise and lower the same. The center of the toggle 10 is connected to the rod 6 by the rod 11, provided with the sliding piece 12. The rod 11 is connected, by the rod 13 and arms 14, rocking on the center 15, to the governor 16. The exhaust-valve 3 is operated by the lever 7 through the valve-rod 17.

It will be obvious that the rotary motion of the crank 5 will give a constant motion to the admission-valve 2 through the parts 6, 7, 8, and 9, and also that the toggle-joint 8 will receive a constant motion through the parts 6 and 11 as long as the rod 11 is unacted upon by the governor 16; but that any motion of the governor 16 will act on the rod 11, so as to cause the sliding piece 12 to slide up or down the rod 6. The toggle-joint will thereby receive an independent motion, which will cause the admission-valve 2 to close during an earlier or later portion of the stroke of the piston in the cylinder 1.

The levers and rods are so arranged that the valve 2 shall open at the commencement of the stroke of the piston in whatever position the rod 11 may be.

The exhaust-valve 3, which is operated by the lever 7, will, as is evident, receive a constant and unvariable motion.

Fig. 3 illustrates a form of joint suitable to replace the toggle-joint 8. Here the lever 7 acts on the valve-rod 9 through the cam-piece 18. It is evident that if the cam-piece 18 is moved to the right by the piece 6 and rod 11, the governor, determining the position of 12, makes the valve 2 close during an earlier or later portion of the stroke.

Fig. 4 shows another arrangement of the toggle-joint, where the topmost joint 23 is fixed to the valve-rod and one of the joints is made of two pieces sliding within each other, so as to give free motion to the gear after the valve is closed.

Fig. 5 shows the third novel way of constructing this gear. On the end of the lever 7 a sliding surface, 20, is provided, on which a sliding piece, 21, rests. The latter is connected by means of a single rod, 22, to the end 23, operating the valve. Rod 11, actuated by slide 12, forces the slide 21 out of its center position and produces the variable motion. The single rod 22 can either be made out of two pieces sliding in each other, or the joint 23 can be made to slide up and down the valve-rod.

The mechanism shown is for admitting and allowing the escape of elastic fluid to and from one end of the cylinder only, a duplicate of such mechanism being employed to control the admission and emission of elastic fluid to the other end of the said cylinder. This class of gear may be applied to engines at present at work, and, if desired, may be worked direct from the crank-shaft, the exhaust-valves being frequently placed below the cylinder and worked by cams.

Fig. 1, Sheet II, is a side elevation; Fig. 2, a sectional end view; and Figs. 3 and 4, enlarged views, showing my improvements applied to a reversing-engine.

In this arrangement the two eccentrics $a\,b$, secured to the crank-shaft $c$, being placed symmetrically to the latter, give motion to the link $d$, suspended from the rocking shaft $e$. $f\,g$ are rods which carry forward to the rocking levers $h\,i$ the motion transmitted from the eccentrics $a\,b$ to the link $d$. The rods $f\,g$ are attached to the link $d$ by the sliding blocks $j\,k$, and are kept in their places by the rods $l\,m$ and the rocking lever $n$. The rocking lever $i$ gives motion to the rod $o$, which actuates, through the rods $p$, the toggle-joint $q$. The action of these toggle-joints is rendered variable by the action of the governor or hand by the rocking lever $r$, which, by means of the link $s$, alters the position of the sliding block $t$ on the rod $o$. The rocking lever $h$ gives a constant motion to the arms $u$, which operate the elastic-fluid admission-valve rods $v$, through the toggle-joints $q$.

It will be obvious that by giving motion to the lever $n$ through a hand-wheel or other convenient power, so as to reverse the position of the rods $f\,g$, the motion causing the opening and closing of the elastic-fluid admission-valves will be controlled by one or other of the eccentrics $a\,b$, and the engine will be reversed.

It will be understood from the above description that the two motions actuating the steam-admission valves—the one constant and the other liable to variation through the action of the governor—may be obtained by various combinations and arrangements of gearing, and that the construction of the variable or compound joint interposed between the elastic-fluid admission-valve and the eccentric or other operating agent may be of various forms.

The applicability of the above-described gear to engines at present constructed and to various types of engines will also be obvious.

I claim as my invention—

1. A valve-gear for engines, constructed substantially as specified, consisting of two systems of levers operated by one or both of the eccentric or operating agents, and connected by a variable or compound joint actuated from the governor, so as to open and again close the admission-valve through two motions, one constant and the other liable to variation, substantially as specified.

2. The toggle-joint having the top joint fixed to the valve-rod, and one of the joints constructed in two pieces, sliding within each other, so as to give free motion to the gear after the valve is closed, substantially as specified.

3. The combination of rod 6 and lever 7 with the exhaust-valve, to impart a constant and unvariable motion thereto, and with the variable or compound joint, arranged as specified, and adapted to operate the admission-valve, substantially as specified.

ALFRED COLLMANN.

Witnesses:
FRANZ FLEISCHHACKER,
T. C. COLLMANN.